US012791011B2

(12) United States Patent
Graff et al.

(10) Patent No.: US 12,791,011 B2
(45) Date of Patent: Nov. 10, 2026

(54) INJECTION REPAIR OF COMPOSITE FATIGUE CRACKS

(71) Applicant: Gulf Wind Technology, Avondale, LA (US)

(72) Inventors: Mitchel Graff, Avondale, LA (US); David King, Avondale, LA (US)

( * ) Notice: Subject to any disclaimer, the term of this patent is extended or adjusted under 35 U.S.C. 154(b) by 0 days.

(21) Appl. No.: 18/770,971

(22) Filed: Jul. 12, 2024

(65) Prior Publication Data

US 2025/0020108 A1 Jan. 16, 2025

Related U.S. Application Data

(60) Provisional application No. 63/526,874, filed on Jul. 14, 2023.

(51) Int. Cl.

| | |
|---|---|
| ***F03D 80/50*** | (2016.01) |
| ***B29C 73/02*** | (2006.01) |
| ***B29C 73/26*** | (2006.01) |
| ***F03D 1/06*** | (2006.01) |
| *B29L 31/08* | (2006.01) |

(52) U.S. Cl.

CPC .......... *F03D 80/502* (2023.08); *B29C 73/025* (2013.01); *B29C 73/26* (2013.01); *F03D 1/0675* (2013.01); *B29C 2073/268* (2013.01); *B29L 2031/085* (2013.01); *F05B 2230/80* (2013.01); *F05B 2280/6003* (2013.01)

(58) Field of Classification Search

None

See application file for complete search history.

(56) References Cited

U.S. PATENT DOCUMENTS

| | | | | |
|---|---|---|---|---|
| 5,023,987 | A | 6/1991 | Wuepper | |
| 6,385,836 | B1 * | 5/2002 | Coltrin | B29C 73/025 29/402.18 |
| 6,955,502 | B2 * | 10/2005 | Warren | E21D 11/38 405/150.2 |
| 7,368,073 | B2 * | 5/2008 | Krogager | B29C 73/025 264/258 |
| 8,454,775 | B2 * | 6/2013 | Stadtlander | B32B 43/00 264/36.1 |
| 9,993,983 | B2 * | 6/2018 | Nishimura | B29C 73/06 |
| 11,292,217 | B2 * | 4/2022 | Roberts | B29C 73/025 |
| 2011/0209347 | A1 | 9/2011 | Deak | |
| 2019/0111637 | A1 | 4/2019 | Hanna | |
| 2021/0164437 | A1 | 6/2021 | Thiebaut | |

FOREIGN PATENT DOCUMENTS

| | | | |
|---|---|---|---|
| CN | 115122683 | A | 9/2022 |

OTHER PUBLICATIONS

"Method of high-pressure adhesive injection at interfaces within a wind turbine blade ED", IP.com Inc, Dec. 10, 2020, 5 pages.

* cited by examiner

*Primary Examiner* — Kayla Mccaffrey

(74) *Attorney, Agent, or Firm* — Jones Walker LLP

(57) ABSTRACT

A system and method for repairing fatigue cracks in a multi-layer composite body. The method includes repairing fatigue cracks at a first interface between a first layer of the multi-layer composite body and a second layer of the multi-layer composite body. The method also includes repairing fatigue cracks at a second interface between the second layer of the multi-layer composite body and a third layer of the multi-layer composite body. The method further includes anchoring the second interface with the third layer of the multi-layer composite body to prevent failure from fatigue cracks.

6 Claims, 15 Drawing Sheets

Related Art

INJECTION REPAIR OF COMPOSITE FATIGUE CRACKS

BACKGROUND

Turbine blades are the primary elements of wind turbines for converting wind energy into electrical energy. Turbine blades typically consist of a suction side shell member and a pressure side shell member that are bonded together at bond lines along a leading edge and a trailing edge of the blade. The bond lines are generally formed by applying a suitable bonding paste or compound along the bond line at a minimum designed bond width between the shell members.

Defects occur in the turbine blades from the original manufacturing process or as a result of operational conditions experienced by the blade. For instance, fatigue crack defects in multi-layer composite structures (such as root bushings) within the turbine blade are very common and these defects cause the turbine blades to come loose off their root bushings and separate from the rotor hub. Structurally, metal bushings at the root of turbine blades, when worn out, may not be able to carry the loads of the rotating blade and become loose. The rotating blades typically slip down from the root bushings at the bottom on a down-swing and impact on the root bushings on a top-swing, causing alternating cycles of tensile and compressive forces on the root bushings. As a result, gaps may develop between the blade and the root bushings. The root bushings, firmly attached to the rotor hub, may finally yield and liberate the blade, resulting in catastrophic turbine failure.

Existing solutions in the wind industry include completely scrapping a faltering blade and procuring a new replacement blade. Otherwise, the damaged blade may have to be taken down, repair holes may have to be bored in the damaged bushings and the bushings may have to be treated with bonding adhesive before being reinstalled. In that event, the internal ridges inside the damaged bushings are commonly drilled out and the repair method relies completely on the strength of the newly introduced bonding adhesive.

Another common industry solution for subsurface defects in blade laminates calls for grinding of the effected blade area and subsequent reapplication of the laminate materials. A defect is removed by grinding/sanding the laminate plies until the defect is exposed. The laminate layers are then reapplied and sanded smooth. Typically, an "over-laminate" ply is added to the repair area for additional strength. However, this additional laminate layer extends above the planar surface of the surrounding blade area and thus disrupts airflow over the blade and degrades aerodynamic performance. In addition, the grind/over-laminate repair procedure requires extensive surface preparation and skills to apply the repair laminate materials, followed by sanding, over-laminating, and painting, all of which are quite laborious and time consuming.

Fatigue crack defects are prevalent in wind industry for many different blade designs and/or types and it has been a challenge to transfer load from metal to composite. The wind turbine blade manufacturing industry has not been able to satisfactorily address manufacturing defects and/or operational conditions defects. In effect, wind turbine blade design and development have primarily focused on wind turbine blades and not root bushings. As a result, performance has been affected and wind turbine blades have failed at the root bushings more often than they should probably have.

Further, blade defects are typically needed to be repaired on-site, to ensure efficient operation of the wind turbine over its design life and power rating.

Accordingly, the industry would benefit from an improved repair procedure for wind turbine blades that is less time consuming, particularly suited for on-site repairs, and results in consistent and structurally sound repairs.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
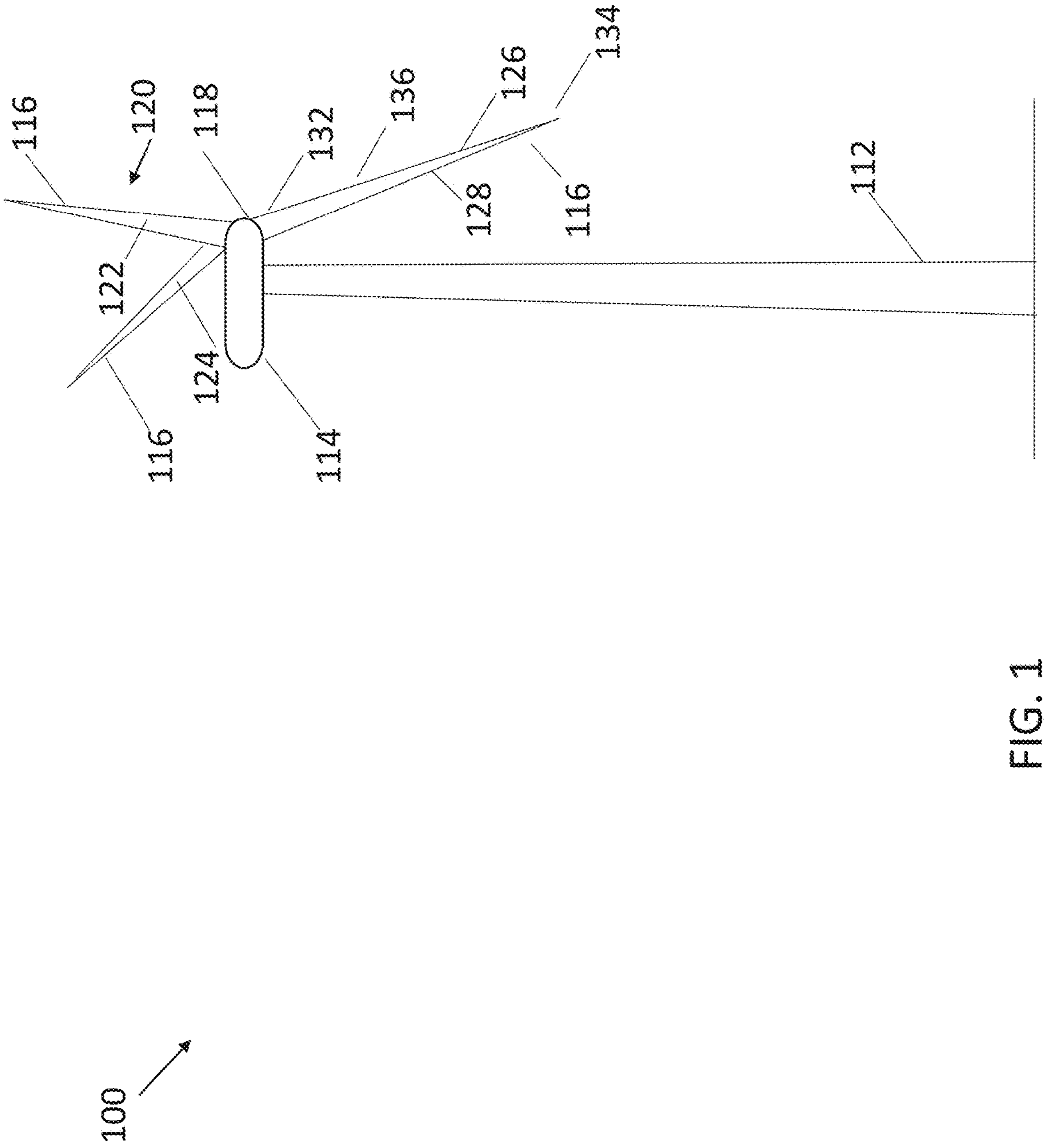
FIG. 1 is an illustrative perspective view of a conventional wind turbine.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Various implementations of the disclosed subject matter relate generally to and may provide improvements to apparatus, systems, and methods to the field of wind turbines, and to a method, system, and a kit for repairing damaged root bushings wind turbine blades. More particularly, the disclosed subject matter relates to a process for repairing fatigue cracks in composite laminate structures by utilizing an injection method that injects a structural adhesive into cracks and porous composite laminates. As a non-limiting example, the adhesive may be a self-etching thermoplastic adhesive which helps in bonding with surfaces that are contaminated with leaks from hydraulic pitch system oils or grease. Further, the thermoplastic adhesive may be heated and re-heated and essentially "self-healed". In other words, if a damage is found during a post-repair inspection, heat blankets may be applied and a defective repair may be repaired again without having to reinject new adhesive. The process additionally uses the same method to inject cleaning chemicals and surface preparation chemicals to prepare several composite bonding surfaces for adhesive injection application.

In an aspect of the disclosed subject matter, a method for repairing fatigue cracks in a multi-layer composite body is disclosed. The method includes repairing fatigue cracks at a first interface between a first layer and a second layer of the multi-layer composite body and repairing fatigue cracks at a second interface between the second layer and a third layer of the multi-layer composite body. The method may also include anchoring the second interface with the third layer of the multi-layer composite body to prevent failure from fatigue cracks.

The method repairing fatigue cracks at the first interface between a first layer of the multi-layer composite body and a second layer of the multi-layer composite body may include drilling a first series of flush holes and a first series of weep holes extending from an outer surface of the composite body to the first interface. The method may further include flushing the first series of flush holes and the first series of weep holes with a high-pressure flushing fluid and drying the first series of flush holes and the first series of weep holes with an air jet. The method may also include drilling a first series of fill holes extending from an outer surface of the composite body to the first interface and installing fluid injection ports in the first series of fill holes. The method further includes injecting a crack-repair fluid through the injection ports to fill the first series of fill holes and thermally curing the crack-repair fluid deposited in the first series of fill holes.

Fatigue cracks at a second interface between the second layer and a third layer of the multi-layer composite body may be repaired by drilling a second series of flush holes a second series of weep holes extending from the outer surface of the composite body to the second interface, flushing the second series of flush holes and the second series of weep holes with a high-pressure flushing fluid, and drying the second series of flush holes and the second series of weep holes with an air jet. Further, a second series of fill holes may be drilled from an outer surface of the composite body to the second interface and fluid injection ports may be installed in the second series of fill holes. The method may also include injecting a crack-repair fluid through the injection ports and filling the second series of fill holes and thermally curing the crack-repair fluid deposited in the second series of fill holes. The second series of fill holes may be arranged and spaced relative to the first series of fill holes in a predetermined force transfer pattern.

Anchoring the second interface against failure from composite fatigue crack may include inclining some of the second series of fill holes transverse to the first series of fill holes and extending the inclined at least one of the second series of fill holes from the third layer through the second layer to the first layer.

The method may also include repairing fatigue cracks at a third interface between the third layer of the multi-layer composite body and a fourth layer of the multi-layer composite body, and anchoring the third interface with the fourth layer of the multi-layer composite body to prevent failure from fatigue cracks.

Repairing fatigue cracks at the third interface between the third layer of the multi-layer composite body and the fourth layer of the multi-layer composite body may include drilling a third series of flush holes and a third series of weep holes extending from the outer surface of the composite body to the third interface, flushing the third series of flush holes and the third series of weep holes with a high-pressure flushing fluid, and drying the third series of flush holes and the third series of weep holes with an air jet. The method may further include drilling a third series of fill holes extending from an outer surface of the composite body to the third interface and installing fluid injection ports in the third series of fill holes. The method may also include injecting a crack-repair fluid through the injection ports and filling the third series of fill holes and thermally curing the crack-repair fluid deposited in the third series of fill holes. The third series of fill holes may be arranged and spaced relative to the second series of fill holes in a predetermined force transfer pattern.

Anchoring the third interface against failure from composite fatigue crack may include inclining some of the third series of fill holes transverse to the second series of fill holes and extending the inclined at least one of the third series of fill holes from the fourth layer through the third layer to the second layer.

In an aspect of the disclosed subject matter, a wind turbine blade with a repaired root bushing is disclosed. The wind turbine blade may include a blade body with a pressure side and a suction side joined at a leading edge and a trailing edge. The blade body may longitudinally extend from a root region to a tip region through a transition region that extends between the root region and the tip region. The blade body may be mechanically connected with a rotor hub through a number of root bushings installed in the root region. The repaired root bushings may include a multi-layer composite body with fatigue cracks repaired at a first interface between a first layer of the multi-layer composite body and a second layer of the multi-layer composite body. There may be other fatigue cracks repaired at a second interface between the second layer of the multi-layer composite body and a third layer of the multi-layer composite body. The second interface is anchored with the third layer of the multi-layer composite body.

In operation, the fatigue cracks at the first interface between the first layer of the multi-layer composite body and the second layer of the multi-layer composite body may be repaired by drilling a series of flush holes from an outer surface of the composite body of the root bushing to the first interface. The flush holes may be initially flushed with a high-pressure flushing fluid and subsequently dried with an air jet. Further, a series of weep holes may be drilled from an outer surface of the composite body to the first interface. Like the flush holes, the weep holes may be flushed with a high-pressure flushing fluid and dried with an air jet. In addition, a series of fill holes may be drilled from an outer surface of the composite body to the first interface and fluid injection ports may be installed in the fill holes. A crack-repair adhesive fluid may be injected through the injection ports and deposited in the first series of fill holes. The crack-repair adhesive fluid may be thermally cured after being deposited in the first series of fill holes.

In a similar structure, the fatigue cracks at the second interface between the second layer of the multi-layer composite body and the third layer of the multi-layer composite body may be repaired by drilling a second series of flush holes from an outer surface of the composite body of the root bushing to the second interface. The second series of flush holes may be initially flushed with a high-pressure flushing fluid and subsequently dried with an air jet. A second series of weep holes may be drilled from an outer surface of the composite body to the second interface. Like the second series flush holes, the second series weep holes may be flushed with a high-pressure flushing fluid and dried with an air jet. In addition, a second series of fill holes may be drilled from an outer surface of the composite body to the second interface and fluid injection ports may be installed in the fill holes. A crack-repair adhesive fluid may be injected through the injection ports and deposited in the second series of fill holes. The crack-repair adhesive fluid may be thermally cured after being deposited in the second series of fill holes.

The second series of fill holes may be arranged and spaced in a predetermined force transfer pattern relative to the first series of fill holes. Further, some of the second series of fill holes may be inclined transverse to the first series of fill holes and extended from the third layer through the second layer to the first layer, to anchor the second interface with the third layer of the multi-layer composite body.

The wind turbine blade may include more fatigue cracks repaired at a third interface between the third layer and a fourth layer of the multi-layer composite body. The third interface may be anchored with the fourth layer of the multi-layer composite body.

In a similar structure, the fatigue cracks repaired at the third interface between the third layer and the fourth layer of the multi-layer composite body may be repaired by drilling a third series of flush holes from an outer surface of the composite body of the root bushing to the third interface. The third series of flush holes may be initially flushed with a high-pressure flushing fluid and subsequently dried with an air jet. Further, a third series of weep holes may be drilled from an outer surface of the composite body to the third interface. Like the third series of flush holes, the third series of weep holes may be flushed with a high-pressure flushing fluid and dried with an air jet. In addition, a third series of fill holes may be drilled from an outer surface of the composite body to the third interface and fluid injection ports may be installed in the fill holes. A crack-repair fluid may be injected through the injection ports and deposited in the third series of fill holes. The crack-repair fluid may be thermally cured after being deposited in the third series of fill holes.

The third series of fill holes may be arranged and spaced in a predetermined force transfer pattern relative to the second series of fill holes. Further, some of the third series of fill holes may be inclined transverse to the second series of fill holes and extended from the fourth layer through the third layer to the second layer, to anchor the third interface with the fourth layer of the multi-layer composite body.

In an aspect of the disclosed subject matter, a repair kit for repairing a damaged root bushing in a wind turbine blade is disclosed. The repair kit may include a drill template configured and arranged to go around a multi-layer composite body. The drill template may define drill locations for a series of flush holes, weep holes, and fill holes in the multi-layer composite body. The repair kit may also include a quantity of crack-repair fluid suited for repairing cracks in the multi-layer composite body and an injector tool configured and arranged to inject the crack-repair fluid through the fill holes.

FIG. 1 is an illustrative perspective view 100 of a conventional wind turbine 100. As shown, the wind turbine 100 may include a tower 112 with a nacelle 114 mounted thereon. The wind turbine 100 may also include a rotatable hub (also referred to as “rotor hub”) 118 with a number of rotor blades 116 mounted thereto, which in turn is connected to a main flange that turns a main rotor shaft (not shown). The wind turbine power generation and control components are typically housed within the nacelle 114. The view of FIG. 1 is provided for illustrative purposes only to place the present disclosure in an exemplary field of use. It should be appreciated that the disclosure is not limited to any particular type of wind turbine configuration.

The wind turbine blade 116 typically includes a blade body 120 with a pressure side 122 and a suction side 124 joining at a leading edge 126, and a trailing edge 128. The blade body 120 longitudinally extends from a root region 132 to a tip region 134 through a transition region 136 extending between the root region 132 and the tip region 134. The blade body 120 is mechanically connected with the rotor hub 118 through a number of root bushings (described in more details in connection with FIGS. 2 to 15 below) installed in the root region 132 of the wind turbine blade 116. The root bushings may typically be made of multi-layer composite structures. The multi-layer composite structures may develop fatigue cracks at several interfaces between several layers of the multi-layer composite structure and timely and up-tower repair of the fatigue cracks may enhance the lifetime and operational efficiency of the wind turbine blades 116.

Figure 2:
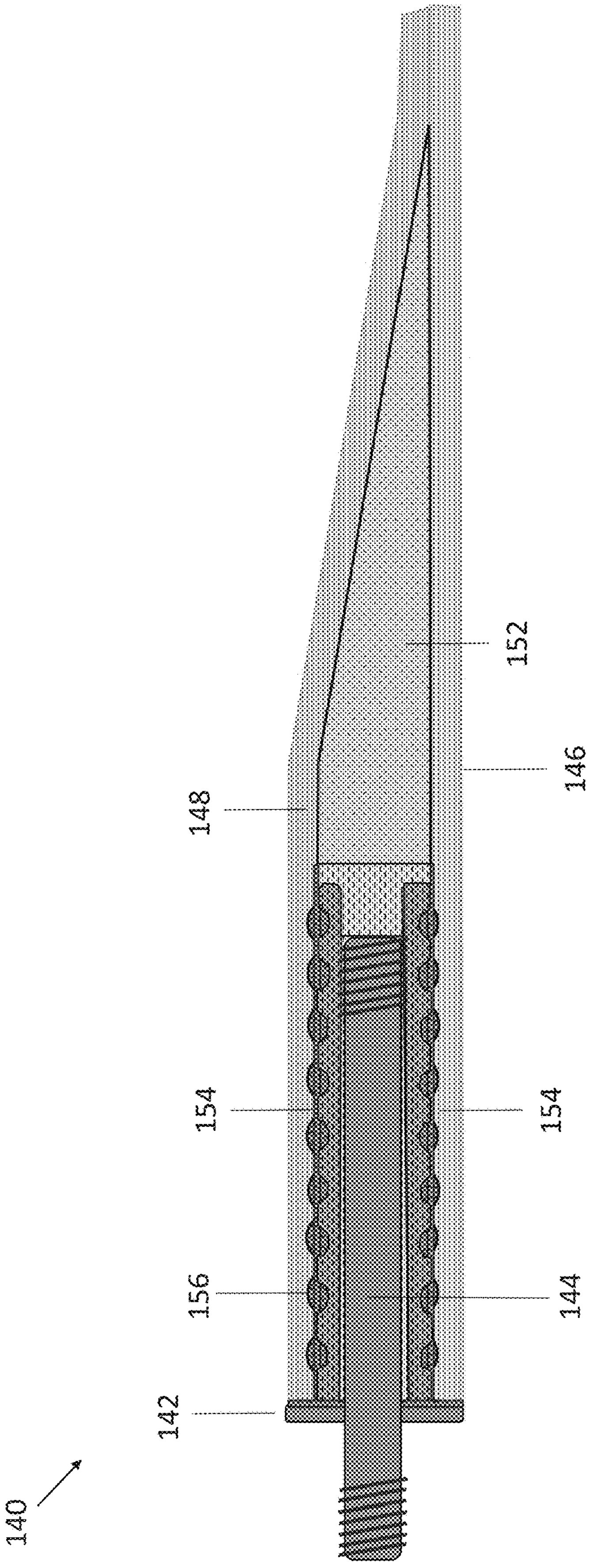
FIG. 2 is an illustrative cross-sectional view of a damaged wind turbine rotor blade root bushing, in accordance with an embodiment of this disclosure.

FIG. 2 is an illustrative cross-sectional view of a damaged wind turbine rotor blade root bushing 140, in accordance with an embodiment of this disclosure. Referring to FIG. 2, the root bushing 140 may include a striker plate 142 used for mechanically connecting the root bushing with the rotor hub 118 (FIG. 1) using an example end threaded rod 144. The root bushing 140 may also include an outer bushing laminate 146, an inner bushing laminate 148, a bushing tail 152 with a chamfered core inside, and a bushing body 154. Oil deposits 156 may be found in the outer bushing laminate 146 or the inner bushing laminate 148 or in the space between the two laminates or in between the inner bushing laminate 148 and the bushing body 154 due to fatigue wear and oil leaks that may be present in the hydraulic systems of the wind turbine blade assembly. As is commonly known, some of the wind turbines use hydraulic systems that pitch the blades and other turbines use electric pitch systems. Most of the affected blades happen to have hydraulic pitch systems and the hydraulic fluid in such hydraulic pitch systems tend to leak. As a result, the root bushings get coated with the leaked hydraulic fluid deposits 156.

Figure 3:
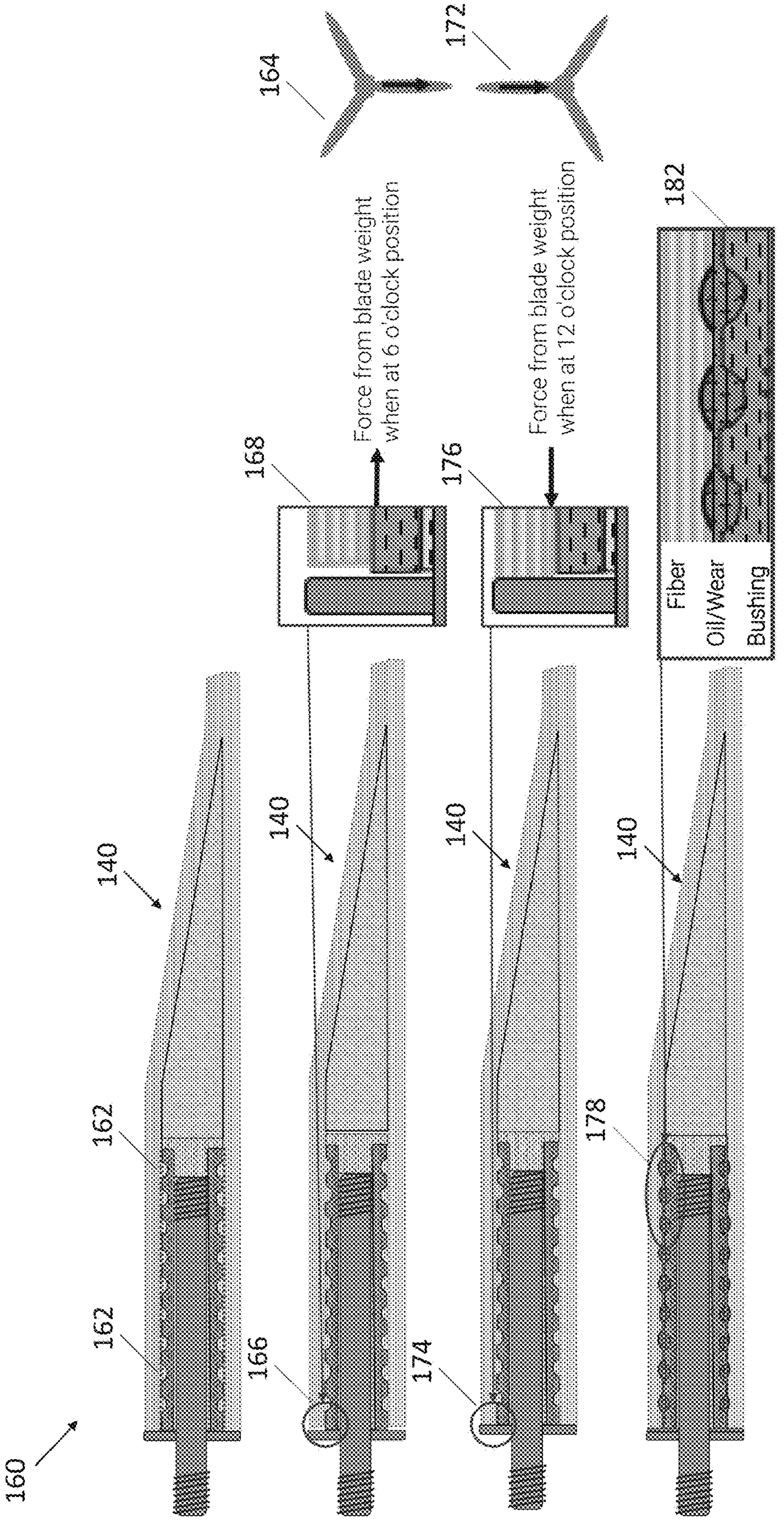
FIG. 3 is an illustrative process overview of defect formation in wind turbine rotor blade root bushing, in accordance with an embodiment of this disclosure.

FIG. 3 is an illustrative process overview 160 of formation of defects in an example root bushing 140 (FIG. 2), in accordance with an embodiment of this disclosure. There may be several stressed areas 162 in the outer bushing laminate 146 or the inner bushing laminate 148 or in the space between the two laminates or in between the inner bushing laminate 148 and the bushing body 154 owing to sustained fatigue from continual operation of the blade. For example, when the blade is in a 6 o'clock position 164, the weight of the blade may exert a tensile force 166 on the root bushings 140, additionally represented in an enlarged view 168. Further, when the blade is in a 12 o'clock position 172, the weight of the blade may exert a compressive force 174 on the root bushings 140, additionally represented in an enlarged view 176. Over time, the deposited oil 178, additionally represented in an enlarged view 182, and the wear may result in failure at several bushing-fiber interfaces.

Figure 4:
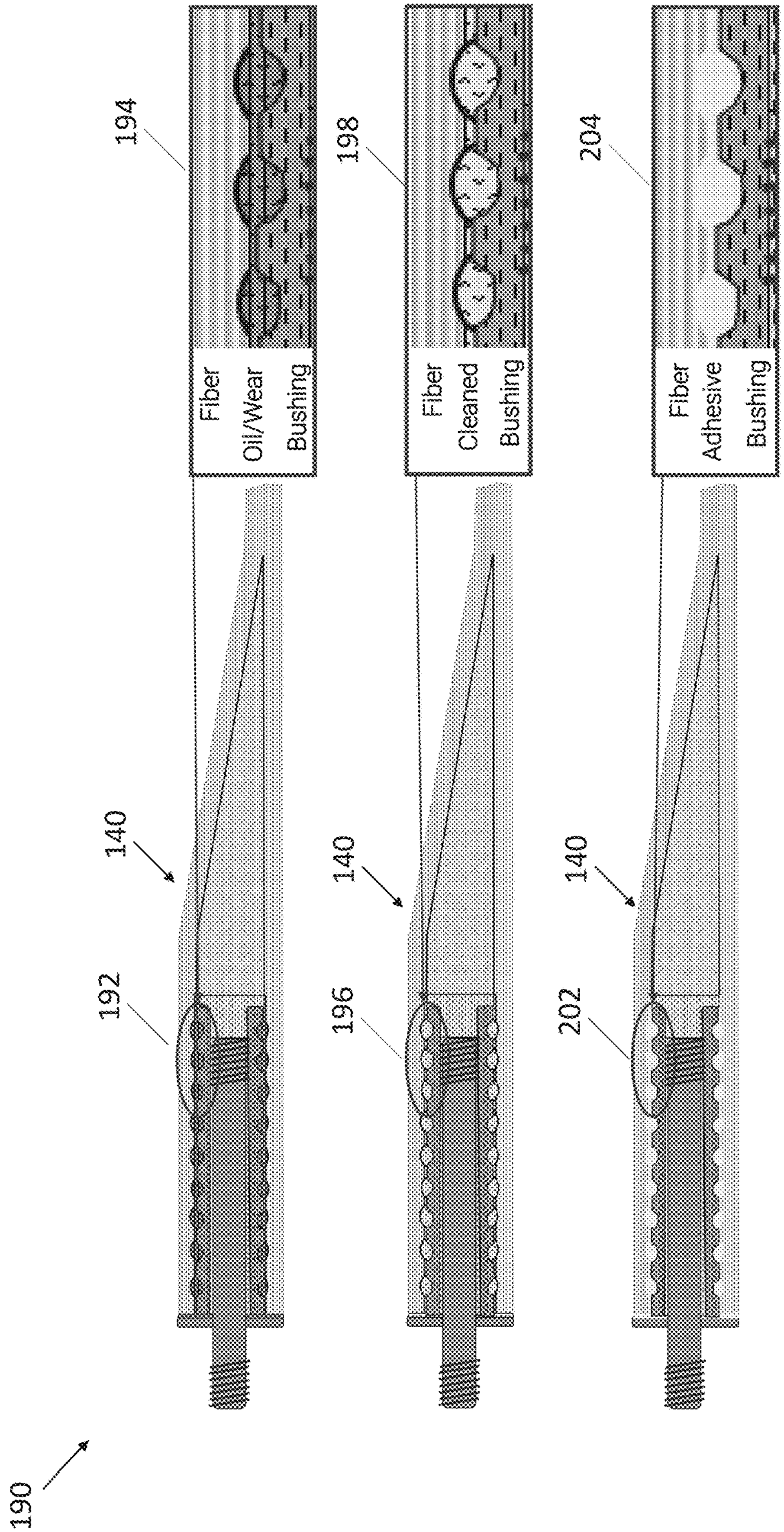
FIG. 4 is an illustrative process overview of repairing a damaged wind turbine rotor blade root bushing, in accordance with an embodiment of this disclosure.

FIG. 4 is an illustrative process overview 190 of repairing a damaged wind turbine rotor blade root bushing, in accordance with an embodiment of this disclosure. Referring to FIG. 4, deposited oil and contaminates 192, additionally represented in an enlarged view 194, may lead to failure in bushing to fiber connection. The deposited oil and contaminates 192 may be removed using a flushing method, as in 196, additionally represented in an enlarged view 198, with specific cleaning solutions. Subsequently, adhesive repair material may be injected into the cleaned up area, as in 202, additionally represented in an enlarged view 204, to repair and reinforce the damaged spots within the root bushings 140.

Figure 5:
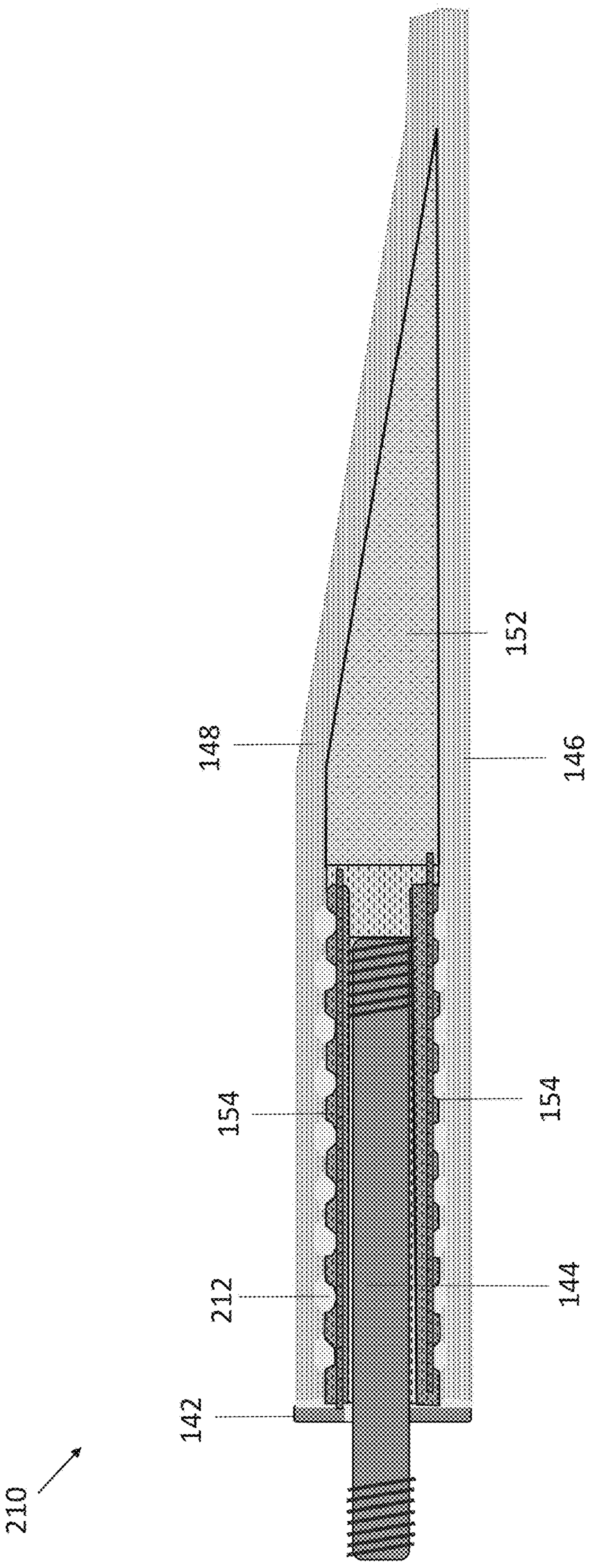
FIG. 5 is an illustrative cross-sectional view of a repaired wind turbine rotor blade root bushing, in accordance with an embodiment of this disclosure.

FIG. 5 is an illustrative cross-sectional view of a repaired wind turbine rotor blade root bushing 210, in accordance with an embodiment of this disclosure. As in FIG. 2, the root bushing 210 may include the striker plate 142, the end threaded rod 144, the outer bushing laminate 146, the inner bushing laminate 148, the bushing tail 152 with the chamfered core, and the bushing body 154. Oil deposits 156 of FIG. 2 have been flushed out and replaced with clean, adhesive deposits 212.

Figure 6:
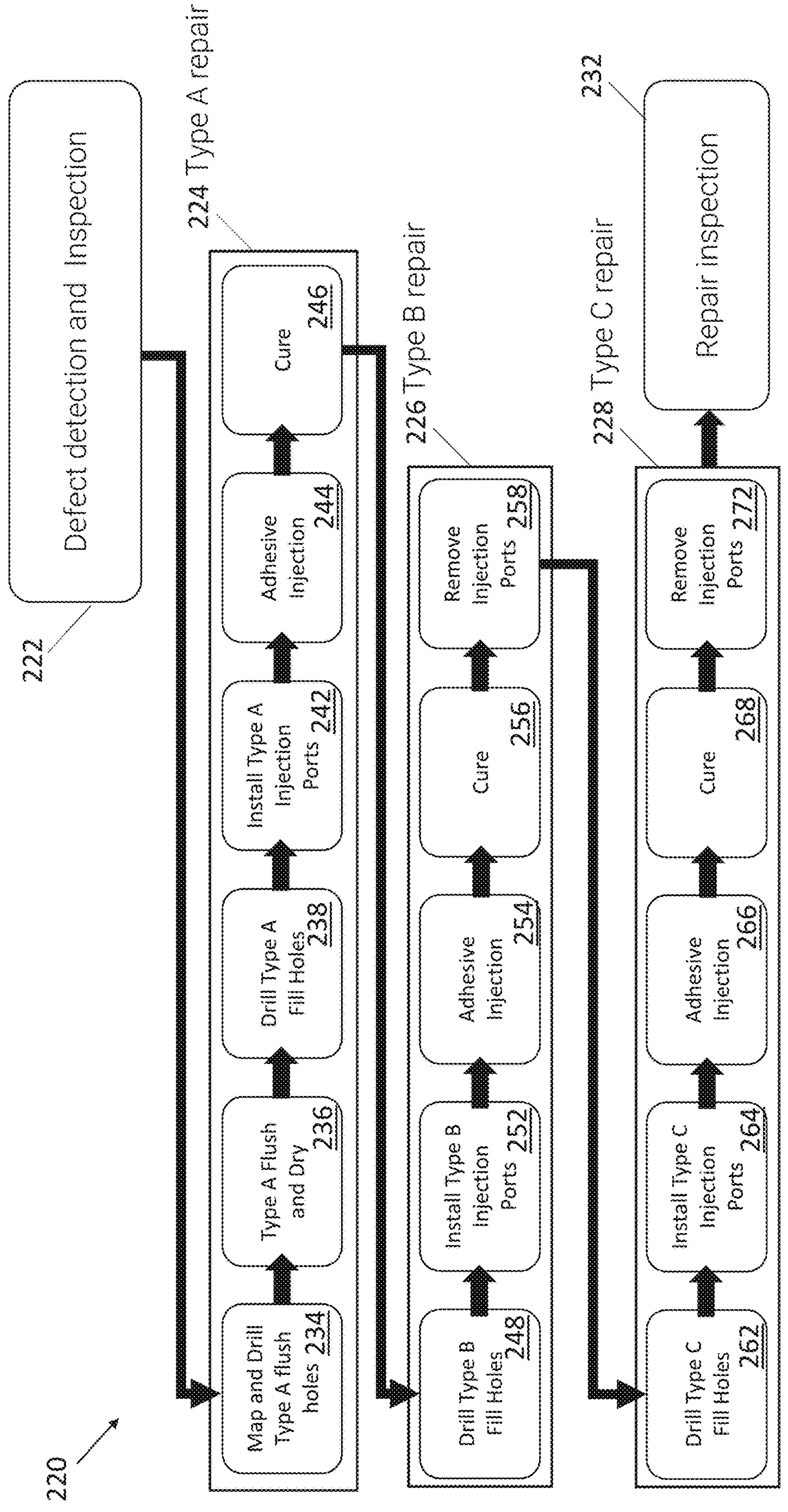
FIG. 6 illustrative process flow view of injection repairing of composite fatigue cracks, in accordance with an embodiment of this disclosure.

FIG. 6 is an illustrative process flow view 220 of injection repairing of composite fatigue cracks, in accordance with an embodiment of this disclosure. The present disclosure provides a way to repair fatigue cracks in a multi-layer composite body after detection and inspection of the defect, as in 222. There may typically be three types of repair, illustratively referred to as "Type A", as in 224, "Type B", as in 226, and "Type C", as in 228, depending on the types of defect. The repaired wind blade, at the end of Type A repair process 224 and/or Type B repair process 226 and/or Type C repair process 228, may be inspected, as in 232 and readied for operation.

To elaborate further, an example Type A repair process 224 may be carried out at a first interface between a first layer (typically a metal bushing) and a second layer (typically a glass wrap) of the root bushing 140. Fatigue cracks may occur at several failure zones localized at the first interface. The fatigue cracks at the first interface between the first layer and the second layer of the root bushing 140 may be repaired by mapping and drilling a series of flush holes (also referred to as "Type A flush holes") from an outer surface of the root bushing 140 to the first interface, as in 234. The series of flush holes may be initially flushed with a high-pressure flushing fluid and subsequently dried with an air jet, as in 236. A series of fill holes (also referred to as "Type A fill holes") may be drilled from an outer surface of the root bushing 140 to the first interface, as in 236 and fluid injection ports may be installed in the fill holes, as in 242. A crack-repair adhesive fluid may be injected through the injection ports and deposited in the fill holes, as in 244. The crack-repair adhesive fluid may be thermally cured after being deposited in the fill holes, as in 246. In effect, the repair at the first interface transitions the failure zones from the first interface to the second interface.

Fatigue cracks may additionally occur at several other failure zones localized at the second interface between the second layer (glass wrap) and a third layer (typically pultrusion) of the root bushing 140. The fatigue cracks at the second interface may be repaired with the crack-repair adhesive fluid. The repair at the second interface reinforces and anchors the second interface with the third layer of the root bushing 140 to prevent failure from fatigue cracks.

Referring back to FIG. 6, an example Type B repair 226 at the second interface may be carried out by mapping and drilling a second series of flush holes (also referred to as "Type B flush holes") and a second series of fill holes running from an outer surface of the composite body of the root bushing to the second interface, as in 248. As in Type A repair, the second series of flush holes and the fill holes may be flushed with a high-pressure flushing fluid and subsequently dried with an air jet. Fluid injection ports may be installed in the fill holes, as in 252. A crack-repair adhesive fluid may be injected through the injection ports and deposited in the second series of fill hole, as in 254. The crack-repair adhesive fluid may be thermally cured after being deposited in the second series of fill holes, as in 256. The injection ports may be withdrawn subsequently, as in 258, after the adhesive is cured.

Referring once again to FIG. 6, an example Type C repair 228 may be carried out for fatigue cracks at a third interface between the third layer and a fourth layer (typically glass laminate) of the root bushing 140. A third series of flush holes (also referred to as "Type C flush holes") and a third series of fill holes running from an outer surface of the composite body of the root bushing to the third interface may be mapped and drilled, as in 262. As in Type A and Type B repair, the third series of flush holes and the fill holes may be flushed with a high-pressure flushing fluid and subsequently dried with an air jet. Fluid injection ports may be installed in the fill holes, as in 264. A crack-repair fluid may be injected through the injection ports and deposited in the third series of fill holes, as in 266. The crack-repair fluid may be thermally cured after being deposited in the third series of fill holes, as in 268. The injection ports may be withdrawn subsequently, as in 272, after the adhesive is cured.

Figure 7:
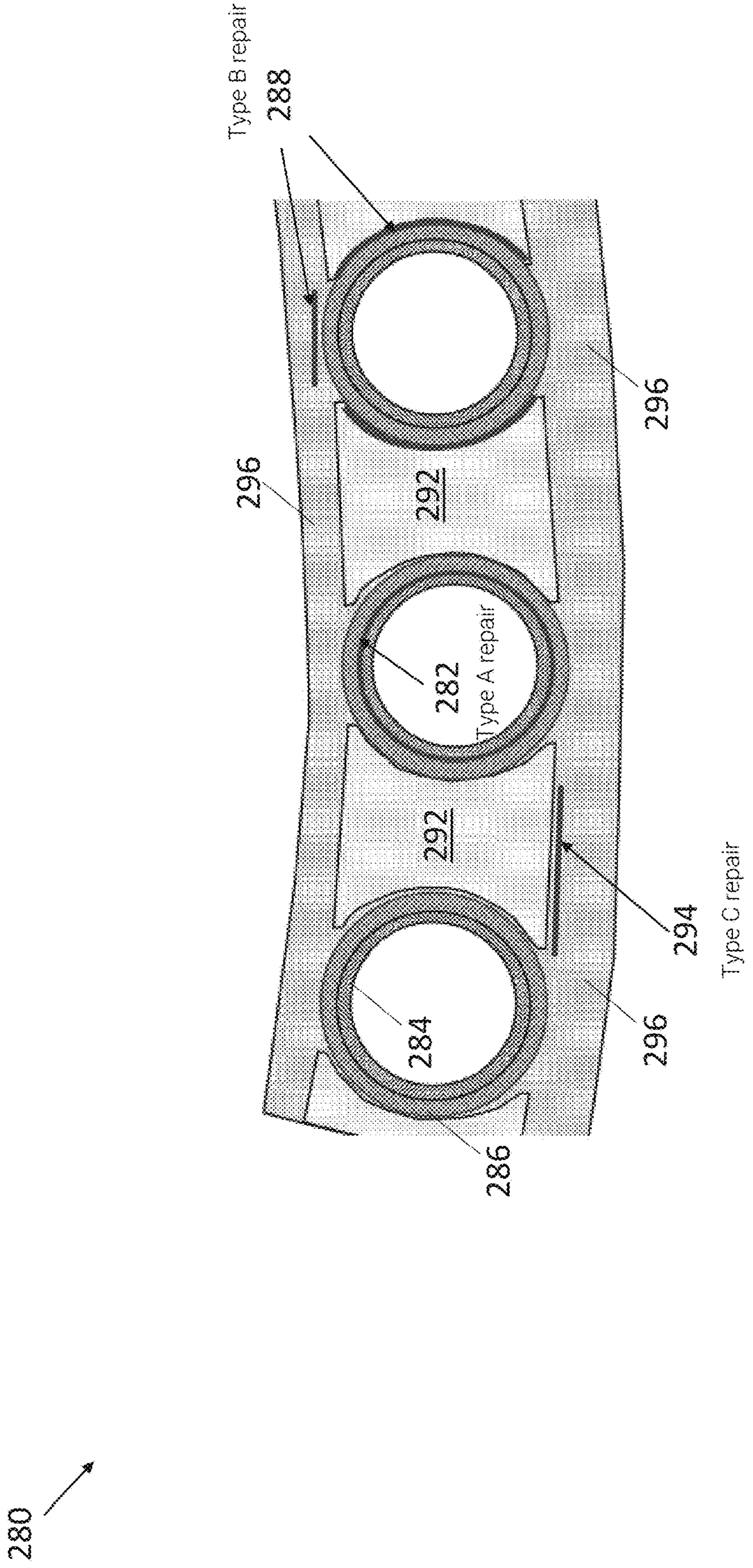
FIG. 7 is an illustrative defect summary in a cross-sectional view of a damaged wind turbine rotor blade root bushing, in accordance with an embodiment of this disclosure.

FIG. 7 is an illustrative defect summary represented in a cross-sectional view 280 of a damaged wind turbine rotor blade root bushing 140 (FIG. 2), in accordance with an embodiment of this disclosure. These views represent root-to-tip and tip-to-root cross-sections. Example Type A repairs 282 carried out first, at the interface between metal bushing 284 and glass wraps 286 may be critical to regain about 80% of the original strength. Example Type B repairs 288 may be carried out next, at the interface between glass wraps 286 and pultrusions 292. Type B repairs 288 may build on the Type A repairs 282 such that the second series of fill holes (described in the context of FIG. 6) may be arranged and spaced in a predetermined force transfer pattern relative to the first series of fill holes (FIG. 6) to transition the first composite fatigue crack failure zones from the first interface to the second interface. Further, some of the second series of fill holes may be inclined transverse to the first series of fill holes and extended from the third layer through the second layer to the first layer, to anchor the second interface with the third layer of the multi-layer composite body.

Example Type C repairs 294 may be the third and final repair carried out at the interface between pultrusions 292 and glass laminates 296. Type C repairs 294 may build on the Type A repairs 282 and Type B repairs 292 such that the third series of fill holes (FIG. 6) may be arranged and spaced in a predetermined force transfer pattern relative to the second series of fill holes (FIG. 6) to transition the second composite fatigue crack failure zones from the second interface to the third interface. Further, some of the third series of fill holes may be inclined transverse to the second series of fill holes and extended from the fourth layer through the third layer to the second layer, to anchor the third interface with the fourth layer of the multi-layer composite body.

Figure 8B:
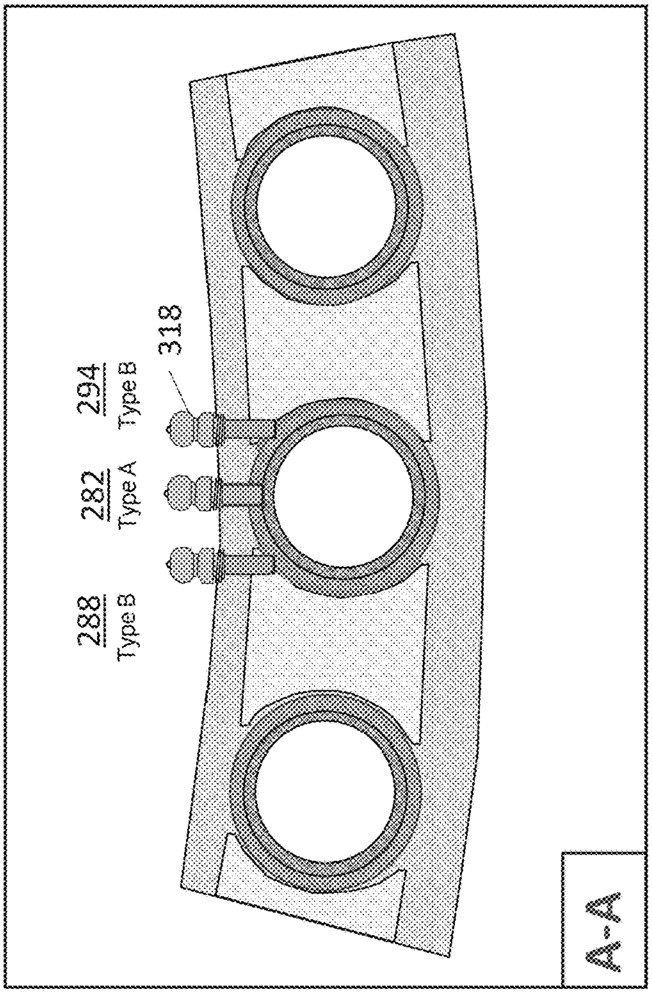
FIG. 8B is an illustrative front view of repairing a damaged wind turbine rotor blade root bushing corresponding to the top view of FIG. 8A, in accordance with an embodiment of this disclosure.
Figure 8A:
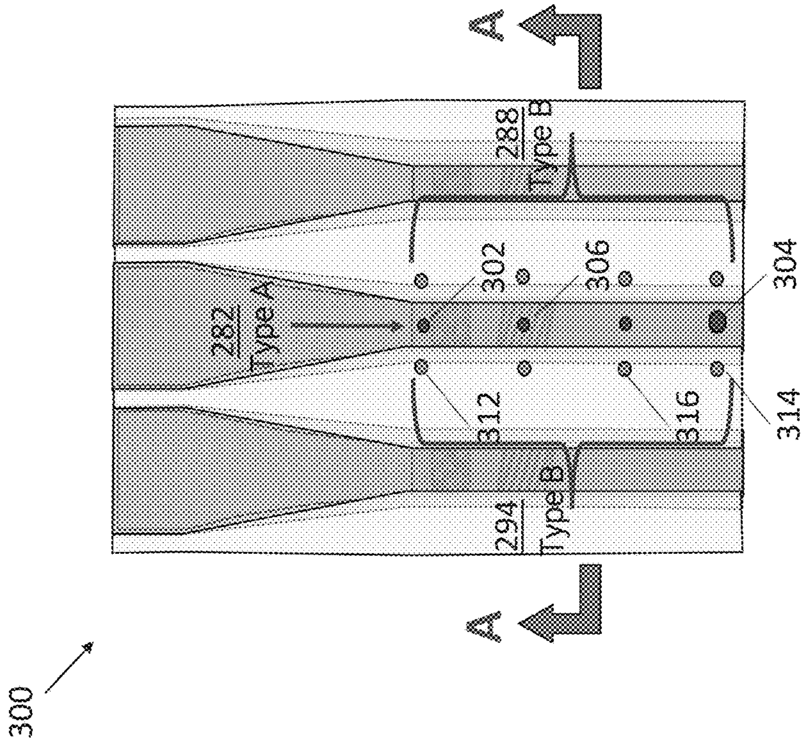
FIG. 8A is an illustrative top view of repairing a damaged wind turbine rotor blade root bushing, in accordance with an embodiment of this disclosure.

FIG. 8A is an illustrative top view 300 of repairing a damaged wind turbine rotor blade root bushing 140 (FIG. 2), in accordance with an embodiment of this disclosure. FIG. 8B is an illustrative front view of repairing a damaged wind turbine rotor blade root bushing 140 (FIG. 2) corresponding to the top view of FIG. 8A. In general, the present disclosure provides a way to repair fatigue cracks in a multi-layer composite body such as the root bushing 140. Referring back to FIG. 8B, there is a first interface (282 of FIG. 7) between a first layer (284, FIG. 7) of the multi-layer composite body and a second layer (286, FIG. 7) of the multi-layer composite body (280, FIG. 7). Fatigue cracks may occur at several failure zones localized at the first interface 282. The fatigue cracks at the first interface 282 may be repaired with a crack-repair adhesive fluid.

Further, there may be a second interface (288, FIG. 7) between the second layer (286, FIG. 7) and a third layer (292, FIG. 7) of the multi-layer composite body (280, FIG. 7). Fatigue cracks may occur at several failure zones localized at the second interface (288, FIG. 7). The fatigue cracks at the second interface (288, FIG. 7) may be repaired with the crack-repair adhesive fluid. In effect, the repair at the first interface (282, FIG. 7) transitions the failure zones from the first interface (282, FIG. 7) to the second interface (288, FIG. 7). Further, the repair at the second interface (288, FIG. 7) may reinforce the second interface and may anchor the second interface (288, FIG. 7) with the third layer (296, FIG. 7) of the multi-layer composite body to prevent failure from fatigue cracks.

Referring back to FIG. 8A, the root bushings may be inspected by non-destructive testing/torque test methods and defective bushings may be identified. Once the defective bushings are identified, example flush holes 302 (for Type A repair) and 312 (for Type B repair), weep holes 304 (for Type A repair) and 314 (for Type B repair), and fill holes 306 (for Type A repair) and 316 (for Type B repair) may be mapped and drilled using pre-designed, optionally 3D printed, drill guides (also referred to as “drill templates”, described in detail in the context of FIG. 9) that reference themselves off a root bushing body. This ensures that the drill holes are made in appropriate places corresponding to the most likely spots of defect and centers of localized failure zones. The drill templates may slide over the root bushing body and the laminates and may help map the spots where the flush holes, weep holes and the fill holes may be drilled. The drill templates may additionally guide holes drilled perpendicular to the bushing body. Once the holes are mapped and drilled, example Zerk fittings 318 (FIG. 8B) may be installed into the drilled holes. The drill bit used may typically be of an appropriate size relative to the Zerk fitting 318.

The example drilled holes 302, 304, 306, 312, 314, 316 and the like may be flushed with modified pressure washer and cleaning fluids until the exiting fluid appear clean. Optionally, compressed air may also be used to blow out any residual cleaning fluids from any cavity. The cleaning and flushing processes may typically begin at the tip side of the wind turbine blade and progress on to the root side of the wind turbine blade because usually there may be a solid laminate behind the tip side that blocks the exit of cleaning and flushing fluids.

As has been mentioned earlier, the root bushings may get coated with leaked hydraulic fluid and cleaning fluids such as mineral spirits may need to be applied to get rid of the leaked hydraulic fluid. In effect, the cleaning fluids may treat the surface of application and prepare a chemically active surface. Operationally, flush holes and weep holes may be drilled in the vicinity of the cracks and microcracks and after drilling, the flush holes and the weep holes may be flushed with cleaning fluids. The cleaning fluids may be usually volatile and not easily flammable. Any remaining residual cleaning fluid may evaporate out. In an embodiment, compressed air may be blown to facilitate evaporation of any residual cleaning fluid.

The flush holes and the weep holes are flushed with a high-pressure flushing fluid, typically with a pressure washer such that a correctly oriented tip is inserted into the flush holes and the weep holes. As the flushing process progresses, a contaminated dirty solution comes out of weep holes and the flushing is continued until the solution becomes cleaner. Subsequently, the flush holes and the weep holes are dried with a compressed air jet correctly oriented into the respective holes. Subsequently, the flush holes and the weep holes are allowed to settle over a period of time so that all cavities are completely dry of the flushing solution.

Optionally, vacuum pumps may be used on the root side to suck the flushing and cleaning fluid through. The vacuum created by the vacuum pumps may effectively boil off any residual cleaning remaining in the cavities and dry out the cavities. Vacuum, however, has a limiting pressure value of 14.7 psi, which is less that the Zerk fitting pressure of thousands of psi. Vacuum suction is likely to be most effective when complete sealing is possible. Further, if the repair is performed down-tower, then drill holes may be drilled in different directions along the bushing. There may be other alternative ways to create the flushing and cleaning pressure such as using gas under pressure. Further, a threaded nozzle may be used for flushing and cleaning after the flushing and cleaning after the rotor blade bolts are removed.

Referring back to FIGS. 8A and 8B, the flushed and cleaned holes 302, 304, 306, 312, 314, 316 may be injection filled with structural adhesive, applied from the tip side of the wind turbine blade to the root side of the wind turbine blade. In effect, the structural adhesives bond the root bushings to the corresponding rovings, as explained in more details below.

Sometimes, it may be advantageous to repair a blade at its load-neutral 3 o’clock or 9 o’clock positions that offer favorable load distribution. Usually, non-destructive testing and inspections methods may be carried out before and after the repairs to evaluate the extent and state of porosity and to assess how to tune the repair efforts for better effects.

In operation, a structural adhesive (also referred to as "adhesive") may be injected into a fractured laminate to repair a wind turbine blade root bushing. As a non-limiting example, the adhesive used in various implementations of the disclosed subject matter may be MethylMethacrolate (MMA) 8120, commercially available off-the-shelf. This adhesive is self-etching, compatible with fatigue conditions and effective with both metals and composites. MMA 8120 possesses low viscosity and does not need to be thinned to reach the laminate cracks and microcracks, driven by pressure. In addition to MMA 8120 other polymers such as epoxy, polyester, vinyl ester, poly eurethane, general eurethane may be used to treat and repair composite fatigue cracks. Further, other polymeric compounds typically used in structural concrete repairs may be used to treat and repair composite fatigue cracks.

Structurally, it is more effective to distribute the weight load of a hanging blade, whether in a commonly known 6 o'clock or a 12 o'clock position, with the internal ridges in place, instead of relying completely on the shear strength of adhesives or resins. The operation is safe, simple and uncomplicated. A hole may be drilled into the damaged laminate and the adhesive may be injected into the hole. This way, the damaged laminates may be brought back to original, if not a better state, by reintroducing mechanical connections that might have worn out over time. This is accomplished by not relying solely on the shear strength of adhesives and resins and rather by reinforcing the shear strength by distributing the tensile and compressive loads over the ridges within the root bushings.

In case of Type B repair (explained in more details later), offset fill holes are drilled to repair the defects between the glass and the pultrusion and flushing may not be possible because the cracks and the microcracks may be too small for any cleaning fluid to access. Type C repair (explained in more details later) may be performed in case of a much smaller cavity and the same structural method may be used. The material, however, may need to be changed and resin may be used instead of adhesives.

Figure 9:
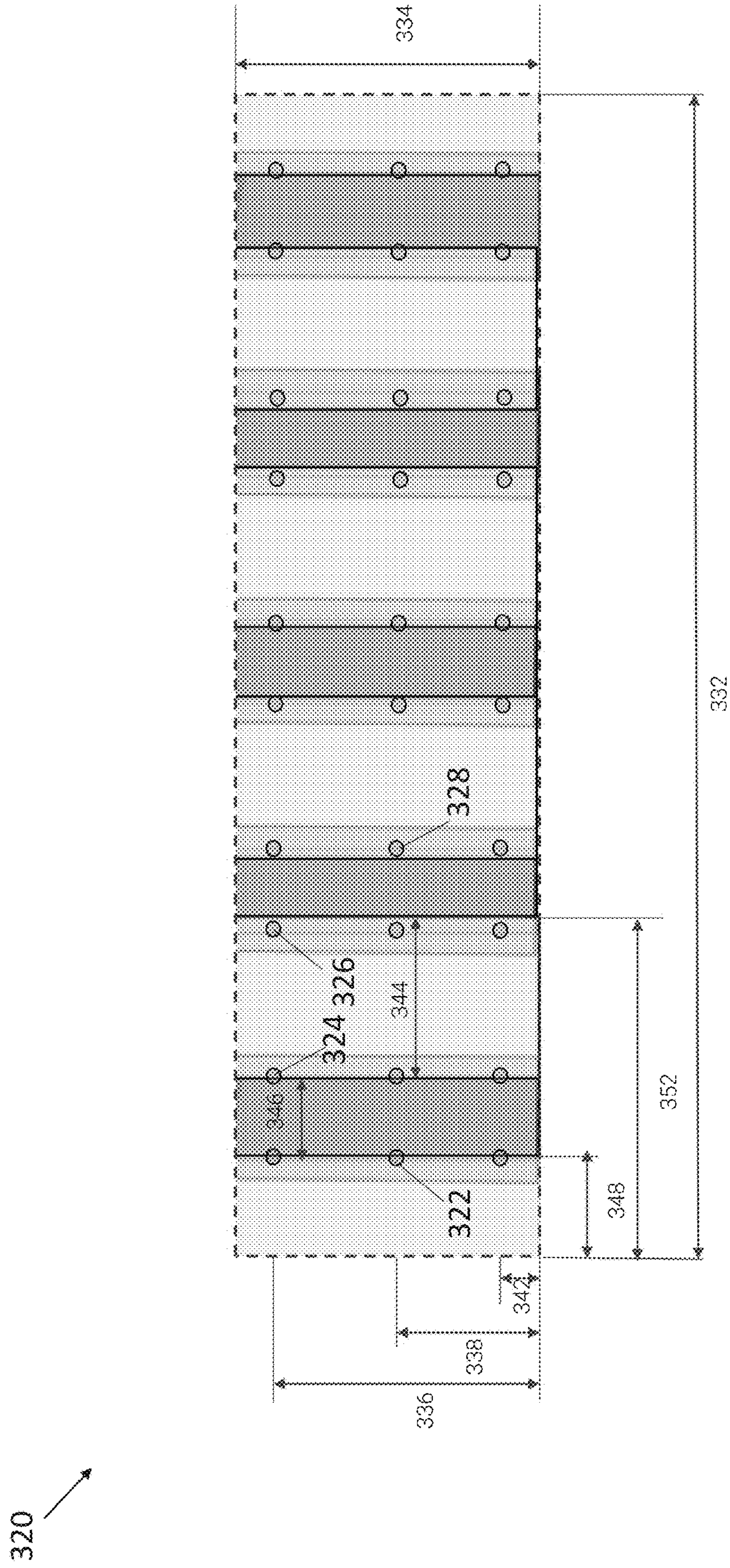
FIG. 9 is an illustrative view of a drill template, in accordance with an embodiment of this disclosure.

FIG. 9 is an illustrative view of a drill template 320 used to drill the example Type A and Type B flush holes, weep holes, and the fill holes in FIGS. 8A and 8B, in accordance with an embodiment of this disclosure. Once the defective bushings are identified, flush holes may be mapped and drilled using the drill template 320 that is referenced off the body of the root bushing 140 (FIG. 2). This ensures that the drill holes are made in appropriate places corresponding to the most likely spots of defect and centers of localized failure zones. The drill template 320 may be configured and arranged to go around the root bushing 140 and define drill locations for the flush holes, weep holes, and fill holes corresponding to centers of localized stress that may lead to concentration of fatigue and eventual failure of the root bushing 140. The drill template 320 may slide over the root bushing body and the laminate and help map the spots where to drill. The drill template 320 may additionally guide holes drilled perpendicular to the bushing body. Once the holes are mapped and drilled, Zerk fittings may be installed into the fill holes. The drill bits used may typically be of an appropriate size relative to the Zerk fitting.

The preconfigured dimensions of the drill template 320, such as a length of a first series of holes 322 on an example first root bushing, a length of a second series of holes 324 on the example first root bushing, a length of a first series of holes 326 on an example second root bushing, a length (i.e., the longer of two planar dimensions) of a second series of holes 328 on the example second root bushing, total length (i.e., the longer of two planar dimensions) of the template 332, total width (i.e., the shorter of two planar dimensions) of the template 334, the distance of the farthest hole from the base line 336, the distance of an example middle hole from the base line 338, the distance of the closest hole from the base line 342, the distance between two rows of holes corresponding to two different bushings 344, the distance between two rows of holes corresponding to one example bushing 346, the distance of the first rows of holes from the side line 348, the distance of the second row of holes from the side line 352 and the like may be optimized by trial and error and/or parametrized in terms of the original dimensions of the bushings. The drilling pattern, the distance between fill holes and the adhesive injecting mechanism impact the performance and effectiveness of the repair. In an example set-up, four holes are drilled 80 mm apart.

Figure 10B:
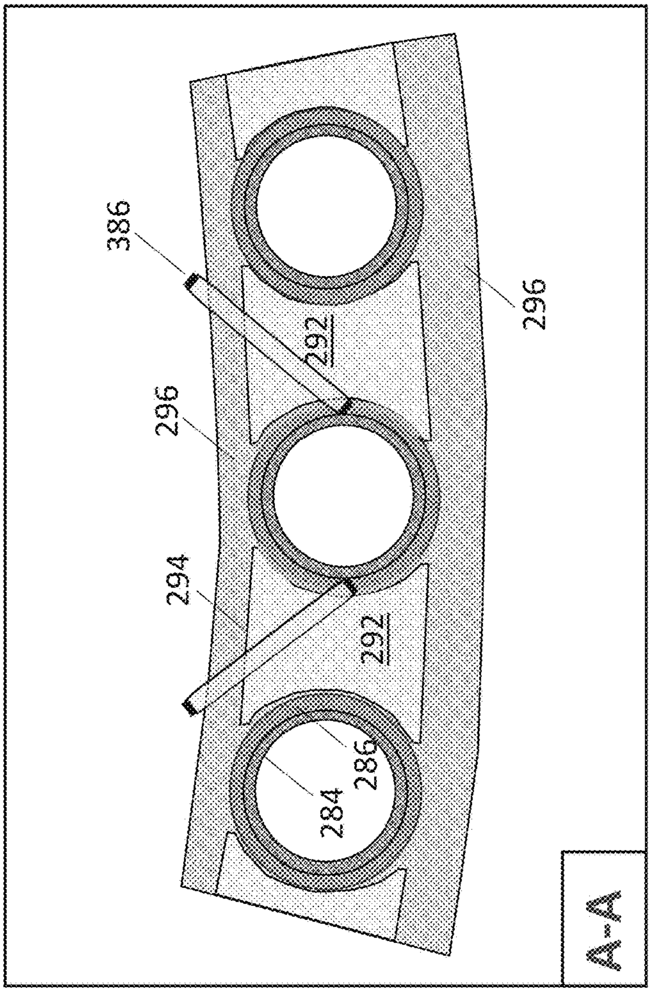
FIG. 10B is an illustrative front view of Type C repair of a damaged wind turbine rotor blade root bushing corresponding to the top view of FIG. 10A, in accordance with an embodiment of this disclosure.
Figure 10A:
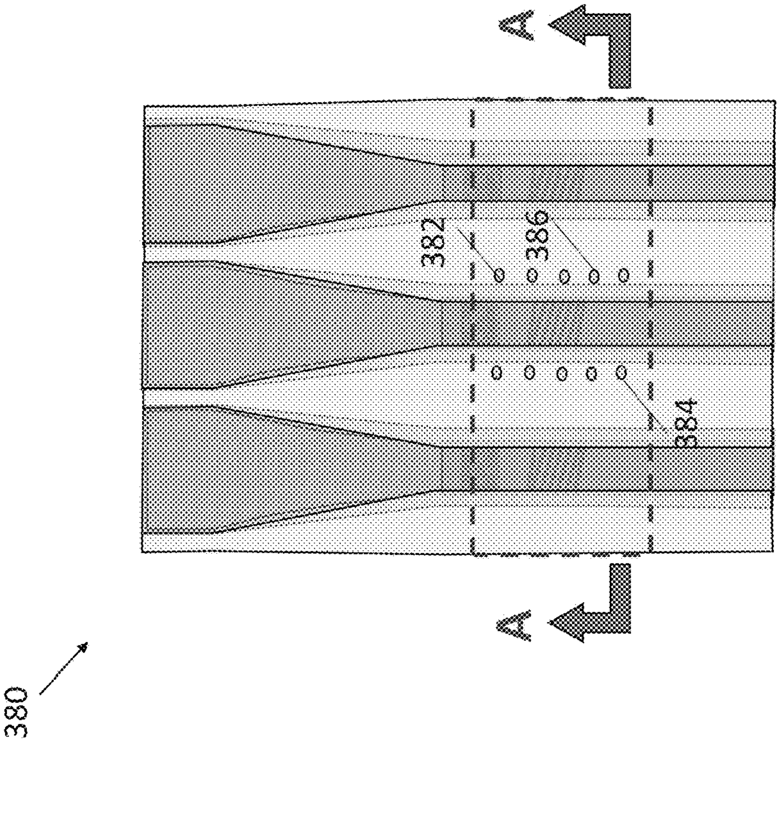
FIG. 10A is an illustrative top view of Type C repair of a damaged wind turbine rotor blade root bushing, in accordance with an embodiment of this disclosure.

FIG. 10A is an illustrative top view 380 of an example Type C repair of a damaged wind turbine rotor blade root bushing, in accordance with an embodiment of this disclosure. FIG. 10B is an illustrative front view of Type C repair of a damaged wind turbine rotor blade root bushing corresponding to the top view of FIG. 10A. Referring to FIG. 10B, there may be a third interface (294 of FIG. 7) between a third layer (292, FIG. 7) of the multi-layer composite body and a fourth layer (296, FIG. 7) of the multi-layer composite body (280, FIG. 7). Fatigue cracks may occur at several failure zones localized at the third interface 294. The fatigue cracks at the third interface 294 may be repaired with a crack-repair fluid. A third series of flush holes (also referred to as "Type C flush holes") 382 may be marked and drilled such that the flush holes 382 extend from an outer surface of the composite body to the third interface. A third series of weep holes 384 may be marked and drilled such that the weep holes 384 extend from the outer surface of the composite body to the third interface.

Referring back to FIGS. 11A and 11B, the root bushings may be inspected by non-destructive testing/torque test methods and defective bushings may be identified. Once the defective bushings are identified, example flush holes 382 (for Type C repair), weep holes 384 (for Type C repair) and fill holes 386 (for Type C repair) may be mapped and drilled using pre-designed, optionally 3D printed, drill templates 320 (FIG. 9). The flush holes 382 and the weep holes 384 may be flushed with a high-pressure flushing fluid. Subsequently the flush holes 382 and the weep holes 384 may be dried with an air jet and allowed to settle over a period of time.

The fill holes 386 may be marked and drilled such that the fill holes 386 extend from the outer surface of the composite body to the third interface. Fluid injection ports may be installed in the third series of fill holes 386. A crack-repair fluid (structural adhesive) may be injected through the injection ports until the fill holes 386 are completely filled with the crack-repair fluid. The crack-repair fluid deposited in the third series of fill holes may be thermally cured over a predetermined period of time.

In effect, the repair at the third and final interface 294 may reinforce and anchor the third interface 294 with the fourth layer (glass laminate) 296 to prevent failure from fatigue cracks. Specifically, some of the third series of fill holes may be laid out in an inclined direction transverse to the third interface such that the inclined fill holes extend from the fourth layer to the third layer as anchor support. The drilled and filled hole 386, extending through the pultrusion into the metal bushing, may structurally perform as anchor rods that reinforce the third interface. The adhesive material is dispensed into a grease gun using a glue gun.

Figure 11:
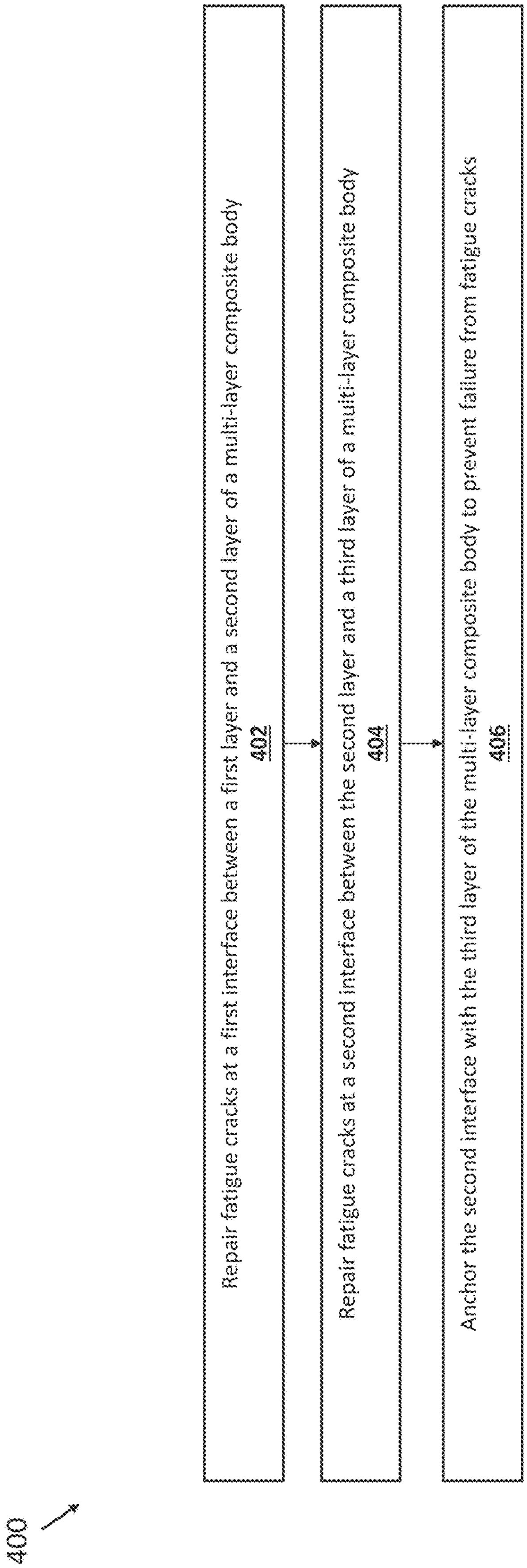
FIG. 11 is an illustrative method of repairing a root bushing installed in the root region of a wind turbine blade.

FIG. 11 is an illustrative method 400 of repairing a root bushing 140 (FIG. 2) installed in the root region of a wind turbine blade. The root bushing 140 may typically include a multi-layer composite body with fatigue cracks repaired at a first interface between a first layer of the and a second layer of the multi-layer composite body, as in 402. There may be other fatigue cracks repaired at a second interface between the second layer of the multi-layer composite body and a third layer of the multi-layer composite body, as in 404. The repair, in effect, transitions composite fatigue crack failure zones from the first interface to the second interface and the second interface is anchored with the third layer of the multi-layer composite body, as in 406.

Figure 12:
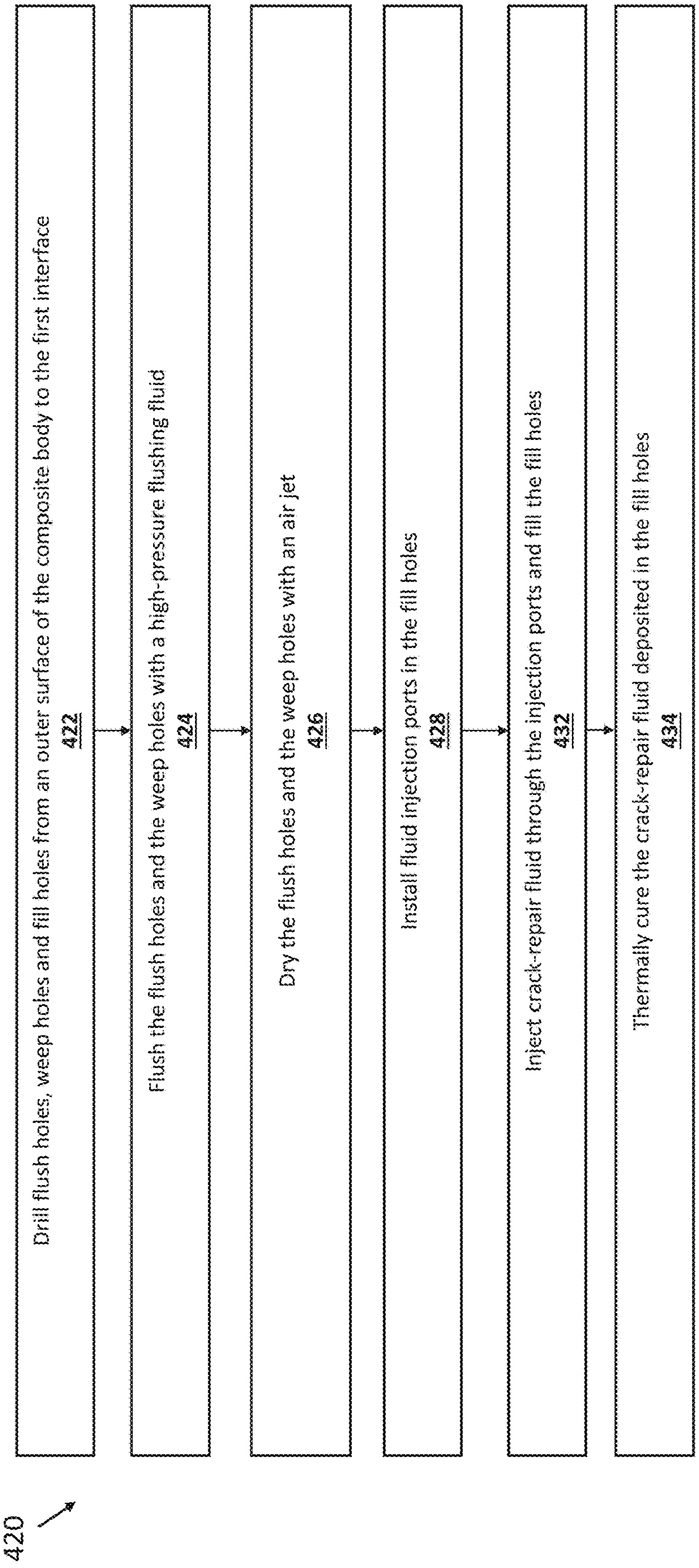
FIG. 12 is an illustrative method of repairing fatigue cracks at a first interface between a first layer and a second layer of the multi-layer composite body.

FIG. 12 is an illustrative method 420 of repairing fatigue cracks at a first interface between a first layer and a second layer of an example root bushing 140 (FIG. 2). The fatigue cracks at the first interface may be repaired by drilling a series of flush holes, weep holes and fill holes from an outer surface of the composite body to the first interface, as in 422. The flush holes and the weep holes may be initially flushed with a high-pressure flushing fluid, as in 424 and subsequently dried with an air jet, as in 426. Further, fluid injection ports may be installed in the fill holes, as in 428. A crack-repair fluid may be injected through the injection ports and deposited in the fill holes, as in 432. The crack-repair fluid may be thermally cured after being deposited in the fill holes, as in 434.

Figure 13:
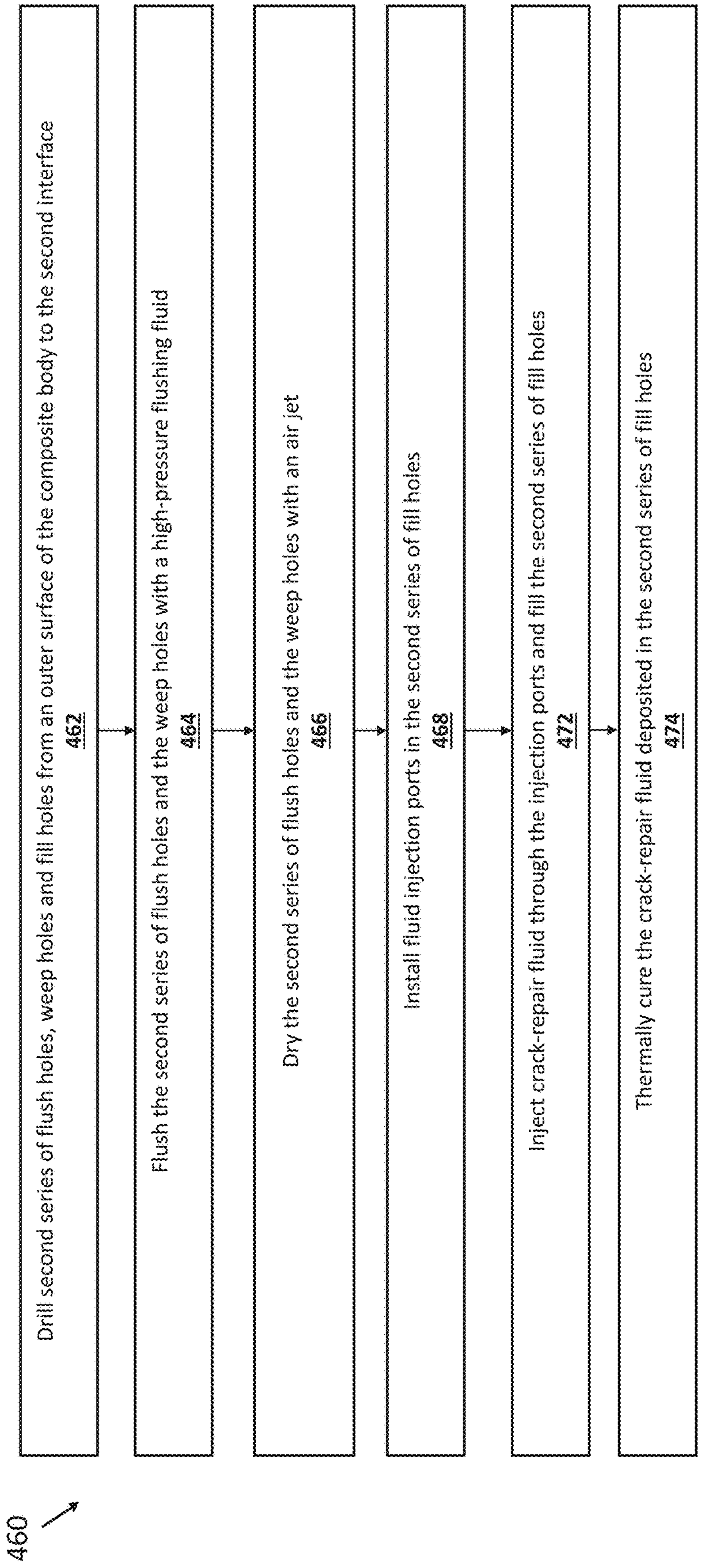
FIG. 13 is an illustrative method of repairing fatigue cracks at a first interface between a first layer and a second layer of the multi-layer composite body.

FIG. 13 is an illustrative method 460 of repairing fatigue cracks at a second interface between a third and a second layer of an example root bushing 140 (FIG. 2). The fatigue cracks at the second interface may be repaired by drilling a second series of flush holes, weep holes and fill holes from an outer surface of the composite body to the second interface, as in 462. The second series of flush holes and the weep holes may be initially flushed with a high-pressure flushing fluid, as in 464 and subsequently dried with an air jet, as in 466. Further, fluid injection ports may be installed in the second series of fill holes, as in 468. A crack-repair fluid may be injected through the injection ports and deposited in the second series of fill holes, as in 472. The crack-repair fluid may be thermally cured after being deposited in the second series of fill holes, as in 474.

The second series of fill holes may be arranged and spaced in a predetermined force transfer pattern relative to the first series of fill holes to transition the first composite fatigue crack failure zones from the first interface to the second interface. Further, some of the second series of fill holes may be inclined transverse to the first series of fill holes and extended from the third layer through the second layer to the first layer, to anchor the second interface with the third layer of the multi-layer composite body.

The wind turbine blade may include more fatigue cracks repaired at a third interface between the third layer of the multi-layer composite body and a fourth layer of the multi-layer composite body. This repair transitions composite fatigue crack failure zones from the second interface to the third interface and the third interface is anchored with the fourth layer of the multi-layer composite body.

Figure 14:
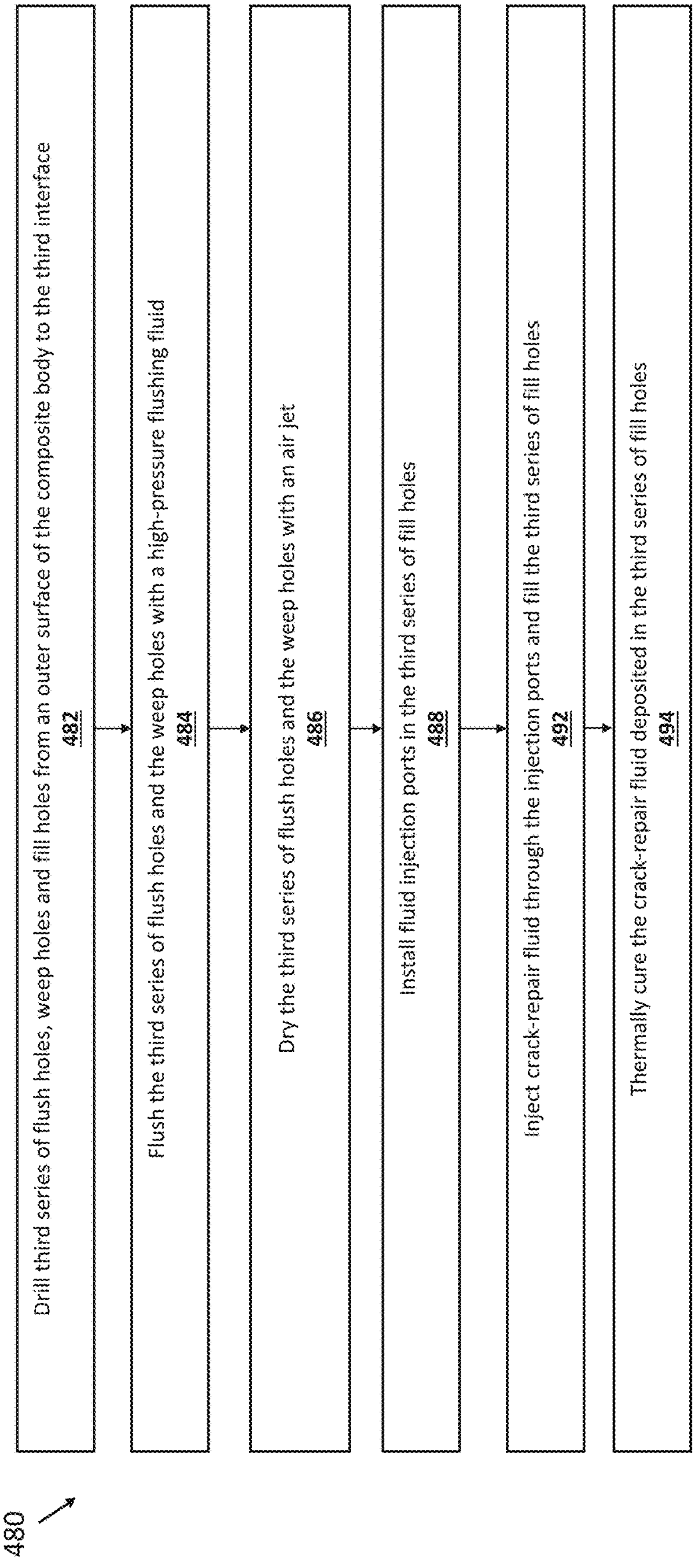
FIG. 14 is an illustrative method of repairing fatigue cracks at a first interface between a first layer and a second layer of the multi-layer composite body.

FIG. 14 is an illustrative method 480 of repairing fatigue cracks at a third interface between the third layer and a fourth layer of an example root bushing 140 (FIG. 2). The fatigue cracks at the third interface may be repaired by drilling a third series of flush holes, weep holes and fill holes from an outer surface of the composite body to the first interface, as in 482. The third series of flush holes and the weep holes may be initially flushed with a high-pressure flushing fluid, as in 484 and subsequently dried with an air jet, as in 486. Further, fluid injection ports may be installed in the third series of fill holes, as in 488. A crack-repair fluid may be injected through the injection ports and deposited in the third series of fill holes, as in 492. The crack-repair fluid may be thermally cured after being deposited in the third series of fill holes, as in 494.

The third series of fill holes may be arranged and spaced in a predetermined force transfer pattern relative to the second series of fill holes to transition the second composite fatigue crack failure zones from the second interface to the third interface. Further, some of the third series of fill holes may be inclined transverse to the second series of fill holes and extended from the fourth layer through the third layer to the second layer, to anchor the third interface with the fourth layer of the multi-layer composite body.

Figure 15:
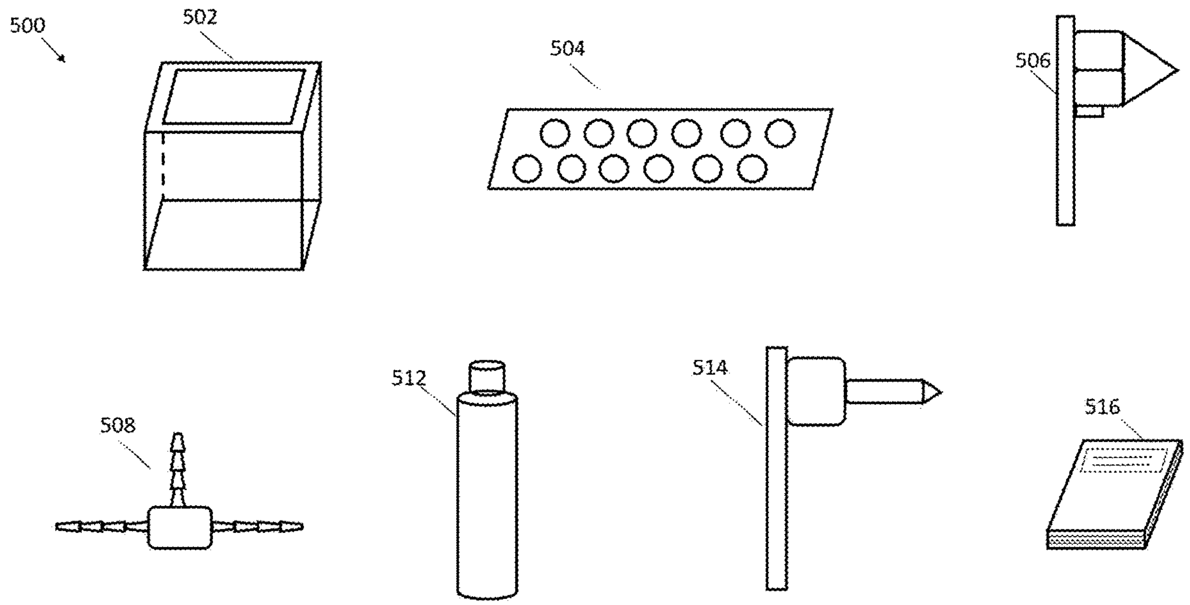
FIG. 15 is an illustrative view of a root busing repair kit for a damaged wind turbine blade.

FIG. 15 is an illustrative view 500 of a root busing repair kit 502 for a damaged wind turbine blade. The repair kit 502 may include a drill template 504 configured and arranged to go around a multi-layer composite body. The drill template 504 may define drill locations for a series of flush holes, weep holes, and fill holes in the multi-layer composite body. The repair kit 502 may also include a flush gun 506 suited for flushing the flush holes and the weep holes and an air drier 508 for drying the flush holes and the weep holes. The air drier 508 may provide a directed supply of dry compressed air applied to the cracked cavities to force evaporation of solvents, cleaning fluids, and any contaminants that may influence the bonding capability in subsequent bonding steps through a mechanical nozzle that focus air into the cavity.

The repair kit 502 may also include a quantity of crack-repair fluid 512 suited for repairing cracks in the multi-layer composite body and an injector tool 514 configured and arranged to inject the crack-repair fluid through the fill holes. The crack repair fluid 512 may be a self-etching adhesive that enables surface preparation of the composite while also providing a chemical bond that may be stronger than the original design. The injector tool 514 may be a drill designed to create injection bore holes conforming to specified dimensions without tearing the composite laminate and to ensure that the holes are installed at specified angles and pitches to the blade surface. The kit 502 may optionally include an instruction manual 516 describing operating instructions to an intended user of the kit 502.

The methods of repair described above, however, are not limited to wind turbine blade root bushings and may be applied to fatigue/laminate crack repair in any composite, in general. Operationally, the adhesive may be injected under pressure and/or in a predetermined volume to repair a cracked laminate and to bring the laminate back to nominal strength. The adhesive may be self-etching and acidic, such that it would burn the surface of application and enhance surface adhesion. First, a number of holes are prepared and surfactants are injected, as dispersant, into the holes to flush out any contamination remaining in any cavity. Further, the adhesive may be heated up for re-bonding. In an embodiment, resins may be used instead of the adhesive to reconnect laminate layers. A predetermined level of pressure may be exerted for the adhesive to find its way into the cracks and microcracks of the laminate and to heal the manufacturing defects.

In the above description, numerous specific details such as resource partitioning/sharing/duplication implementations, types and interrelationships of system components, and logic partitioning/integration choices are set forth in order to provide a more thorough understanding. Embodiments disclosed herein may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method of repairing fatigue cracks in a multi-layer composite body, the method comprising:

repairing fatigue cracks at a first interface between a first layer of the multi-layer composite body and a second layer of the multi-layer composite body;

repairing fatigue cracks at a second interface between the second layer of the multi-layer composite body and a third layer of the multi-layer composite body; and anchoring the second interface with the third layer of the multi-layer composite body to prevent failure from fatigue cracks, wherein the repairing fatigue cracks at a first interface between a first layer of the multi-layer composite body and a second layer of the multi-layer composite body comprises:

drilling a first series of flush holes extending from an outer surface of the composite body to the first interface;

drilling a first series of weep holes extending from the outer surface of the composite body to the first interface;

flushing the first series of flush holes and the first series of weep holes with a first high-pressure flushing fluid;

drying the first series of flush holes and the first series of weep holes with an air jet;

drilling a first series of fill holes extending from the outer surface of the composite body to the first interface;

installing fluid injection ports in the first series of fill holes;

injecting a crack-repair fluid through the injection ports and filling the first series of fill holes; and thermally curing the crack-repair fluid deposited in the first series of fill holes, wherein the repairing fatigue cracks at a second interface between the second layer of the multi-layer composite body and a third layer of the multi-layer composite body comprises:

drilling a second series of flush holes extending from the outer surface of the composite body to the second interface;

drilling a second series of weep holes extending from the outer surface of the composite body to the second interface;

flushing the second series of flush holes and the second series of weep holes with a second high-pressure flushing fluid;

drying the second series of flush holes and the second series of weep holes with an air jet;

drilling a second series of fill holes extending from the outer surface of the composite body to the second interface;

installing fluid injection ports in the second series of fill holes;

injecting a crack-repair fluid through the injection ports and filling the second series of fill holes; and thermally curing the crack-repair fluid deposited in the second series of fill holes, wherein the anchoring the second interface against failure from composite fatigue crack comprises:

inclining at least one of the second series of fill holes transverse to the first series of fill holes; and extending the inclined at least one of the second series of fill holes from the third layer through the second layer to the first layer.

2. The method of claim 1 further comprising:

arranging and spacing the second series of fill holes relative to the first series of fill holes in a predetermined force transfer pattern.

3. The method of claim 1 further comprising:

repairing fatigue cracks at a third interface between the third layer of the multi-layer composite body and a fourth layer of the multi-layer composite body; and anchoring the third interface with the fourth layer of the multi-layer composite body to prevent failure from fatigue cracks.

4. The method of claim 3, wherein the repairing fatigue cracks at the third interface between the third layer of the multi-layer composite body and the fourth layer of the multi-layer composite body comprises:

drilling a third series of flush holes extending from the outer surface of the composite body to the third interface;

drilling a third series of weep holes extending from the outer surface of the composite body to the third interface;

flushing the third series of flush holes and the third series of weep holes with a high-pressure flushing fluid;

drying the third series of flush holes and the third series of weep holes with an air jet;

drilling a third series of fill holes extending from the outer surface of the composite body to the third interface;

installing fluid injection ports in the third series of fill holes;

injecting a crack-repair fluid through the injection ports and filling the third series of fill holes; and thermally curing the crack-repair fluid deposited in the third series of fill holes.

5. The method of claim 4 further comprising:

arranging and spacing the third series of fill holes relative to the second series of fill holes in a predetermined force transfer pattern.

6. The method of claim 4, wherein the anchoring the third interface against failure from composite fatigue crack comprises:

inclining at least one of the third series of fill holes transverse to the second series of fill holes; and extending the inclined at least one of the third series of fill holes from the fourth layer through the third layer to the second layer.

* * * * *